(12) United States Patent
Sakaguchi et al.

(10) Patent No.: US 6,326,324 B1
(45) Date of Patent: *Dec. 4, 2001

(54) ULTRAVIOLET AND INFRARED RADIATION ABSORBING GLASS

(75) Inventors: Koichi Sakaguchi; Shigeki Nakagaki, both of Osaka (JP)

(73) Assignee: Nippon Sheet Glass Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/462,150

(22) PCT Filed: Jun. 11, 1998

(86) PCT No.: PCT/JP98/02584

§ 371 Date: Jan. 3, 2000

§ 102(e) Date: Jan. 3, 2000

(87) PCT Pub. No.: WO99/01392

PCT Pub. Date: Jan. 14, 1999

(30) Foreign Application Priority Data

Jul. 2, 1997 (JP) .................................................. 9-176800

(51) Int. Cl.$^7$ .............................. C03C 3/087; C03C 3/095
(52) U.S. Cl. ................................ 501/64; 501/65; 501/66; 501/71
(58) Field of Search ................................. 501/64, 65, 66, 501/71, 72, 904, 905

(56) References Cited

U.S. PATENT DOCUMENTS 5,318,931 * 6/1994 Nakaguchi et al. .................... 501/64
5,776,846 * 7/1998 Sakaguchi et al. .................... 501/70
5,858,896 * 1/1999 Nagashima et al. ................... 501/66
5,958,811 * 9/1999 Sakaguchi et al. .................... 501/71

FOREIGN PATENT DOCUMENTS

| 0 565 882 | 10/1993 | (EP) . |
|---|---|---|
| 799 805-A | * 10/1997 | (EP) . |
| 2 672 587 | 8/1992 | (FR) . |
| 2 690 437 | 10/1993 | (FR) . |
| XP002077153 | 12/1994 | (GB) . |
| 06345483-A | * 12/1994 | (JP) . |
| 09235135-A | * 9/1997 | (JP) . |
| 09286632-A | * 11/1997 | (JP) . |
| 10072239-A | * 3/1998 | (JP) . |
| 10152342-A | * 6/1998 | (JP) . |
| 97/21635 | 6/1997 | (WO) . |

* cited by examiner

*Primary Examiner*—David R. Sample
(74) *Attorney, Agent, or Firm*—Sughrue, Mion, Zinn, Macpeak & Seas, PLLC

(57) ABSTRACT

An ultraviolet and infrared radiation absorbing glass is disclosed, which has a bronze or neutral gray tint, a low ultraviolet transmission, and a low total solar energy transmission and is suitable for use as a window glass for motor vehicles or buildings. The glass comprises, in % by weight: basic glass components comprising 65 to 80% $SiO_2$, 0 to 5% $B_2O_3$, 0 to 5% $Al_2O_3$, 0 to 10% MgO, 5 to 15% CaO, 10 to 18% $Na_2O$, and 0 to 5% $K_2O$, provided that the sum of MgO and CaO is 5 to 15% and the sum of $Na_2O$ and $K_2O$ is 10 to 20%; coloring components comprising 0.20 to 0.30% total iron oxide (T-$Fe_2O_3$) in terms of $Fe_2O_3$, 0.65 to 1.1% $CeO_2$, 0.35 to 1.1% $TiO_2$, 0.001 to 0.005% CoO, and 0.0003 to 0.0015% Se; and an additional component comprising 0.02 to 0.30% $SO_3$, wherein 20.5 to 25% of said T-$Fe_2O_3$ is FeO in terms of $Fe_2O_3$.

6 Claims, No Drawings

ULTRAVIOLET AND INFRARED RADIATION ABSORBING GLASS

TECHNICAL FIELD

The present invention relates to an ultraviolet and infrared radiation absorbing glass having a bronze or neutral gray tint.

TECHNICAL BACKGROUND

In order to meet the demand for protection of interior trim of automobiles against deterioration, which has been increasing with the recent trend to luxury of the interior trim, and to reduce the load of air conditioning, a glass having ultraviolet and infrared radiation absorbing power has recently been proposed as an automotive window glass.

For example, a green tinted glass containing a relatively large amount of $Fe_2O_3$ and having enhanced heat radiation and ultraviolet radiation absorbing power has been developed for automotive use.

In glasses having a bronze or brown tint, the ultraviolet radiation absorbing power thereof is enhanced by using $CeO_2$ and $TiO_2$ at a lower $Fe_2O_3$ content than the green tinted glass. For example, the heat radiation absorbing glass having a bronze tint disclosed in JP-A-6-40741 (the term "JP-A" as use herein means an "unexamined published Japanese patent, application") comprises, in % by weight, basic glass components comprising 68 to 74% $SiO_2$, 0.1 to 3% $Al_2O_3$, 2 to 4.5% MgO, 8 to 11% CaO, 11.5 to 16% $Na_2O$, 0.5 to 3.0% $K_2O$, and 0.1 to 0.4% $SO_3$, provided that the sum of $SiO_2$ and $Al_2O_3$ is 68 to 74%, the sum of CaO and MgO is 11 to 15%, and the sum of $Na_2O$ and $K_2O$ is 12 to 17%, and coloring components comprising 0.13 to 0.55% total iron oxide in terms of $Fe_2O_3$, 0.2 to 0.6% $CeO_2$, and 0.15 to 0.45% $TiO_2$, and further comprises 0.3 to 14 ppm CoO and 5 to 20 ppm Se. This glass has a reduction rate ($Fe^{2+}/Fe^{3+}$) of 17 to 55%.

The ultraviolet radiation absorbing colored glass disclosed in JP-A-6-345482 is a brown tinted glass which comprises, in % by weight, 65 to 75% $SiO_2$, 0.1 to 5% $Al_2O_3$, 1 to 6% MgO, 5 to 15% CaO, 10 to 18% $Na_2O$, 0 to 5% $K_2O$, 0.05 to 1.0$SO_3$, 0.2 to 1.5% $CeO_2$, 0 to 1.0% $TiO_2$, 0 to 0.0015% CoO, 0.0002 to 0.0012% Se, and 0.2 to 0.4% $Fe_2O_3$, wherein 3 to 15% of the total iron oxide in terms of $Fe_2O_3$ is FeO.

The ultraviolet radiation absorbing colored glass disclosed in JP-A-6-345483 is a glass which comprises, in % by weight, 65 to 75% $SiO_2$, 0.1 to 5% $Al_2O_3$, 1 to 6% MgO, 5 to 15% CaO, 10 to 18% $Na_2O$, 0 to 5% $K_2O$, 0.05 to 1.0% $SO_3$, 0.4 to 1.0% $CeO_2$, 0 to 1.0% $TiO_2$, 0.0018 to 0.0030% CoO, 0.0001 to 0.0010% Se, and 0.1 to 0.3% $Fe_2O_3$, wherein 3 to 20% of the total iron oxide in terms of $Fe_2O_3$ is FeO.

Furthermore, the gray glass composition disclosed in JF-A-8-48540 is a colored glass composition having a dull gray tint which comprises, in % by weight, 66 to 75% $SiO_2$, 0 to 5% $Al_2O_3$, 0 to 5% MgO, 5 to 15% CaO, 10 to 20% $Na_2O$, 0 to 5% $K_2O$, 0.0003 to 0.0050% CoO, 0.0001 to 0.0015% Se, and 0.30 to 0.70% $Fe_2O_3$ (total iron oxide), with the FeO content being up to 0.21%, and which may further contain up to 2.0% $CeO_2$, $V_2O_5$, $TiO_2$, and $MoO_3$.

The above-described conventional ultraviolet and infrared radiation absorbing glasses have an ultraviolet radiation absorbing power imparted by $Fe_2O_3 CeO_2$, and $TiO_2$, and by interactions among them. However, in the glasses having a bronze or neutral gray tint obtained by using the coloration of Se, the $Fe_2O_3$ content must be reduced to a relatively low level in order to maintain the pink coloration of Se. Consequently, it has been difficult to achieve both a bronze or neutral gray tint and high ultraviolet radiation absorbing power.

That is, there has been the following problems. When the $TiO_2$ content is increased, the glass tends to be yellowish. Even when the $CeO_2$ content is increased, the coloration of Se is sometimes insufficient depending on the oxidation and reduction state of the glass, so that the ultraviolet radiation absorbing power is not effectively increased.

This kind of glasses further have a drawback that an increase in the proportion of FeO in total iron oxide tends to result in the above-described problems concerning color tint. In the case of ordinary glasses having a bronze or neutral gray tint and not having high ultraviolet radiation absorbing power, an increase in FeO proportion may impair the infrared radiation absorbing power thereof.

The present invention has been made in the light of the above-described problems associated with the conventional techniques.

An object of the present invention is to provide an ultraviolet and infrared radiation absorbing glass having a bronze or neutral gray tint and having especially high ultraviolet radiation absorbing power and satisfactory infrared radiation absorbing power.

DISCLOSURE OF THE INVENTION

The present invention provides an ultraviolet and infrared radiation absorbing glass comprising, in % by weight:

basic glass components comprising
  65 to 80% $SiO_2$,
  0 to 5% $B_2O_3$,
  0 to 5% $Al2O_3$,
  0 to 10% MgO,
  5 to 15% CaO,
  10 to 18% $Na_2O$, and
  0 to 5% $K_2O$,
provided that the sum of MgO and CaO is 5 to 15% and the sum of $Na_2O$ and $K_2O$ is 10 to 20%;

coloring components comprising
  0.20 to 0.30% total iron oxide (T-$Fe_2O_3$) in terms of $Fe_2O_3$,
  0.65 to 1.1% $CeO_2$,
  0.35 to 1.1% $TiO_2$,
  0.001 to 0.005% CoO, and
  0.0003 to 0.0015% Se; and an additional component comprising
  0.02 to 0.30% $SO_3$,
wherein 20.5 to 25% of said T-$Fe_2O_3$ is FeO in terms of $Fe_2O_3$.

PREFERRED EMBODIMENTS OF THE INVENTION

The ultraviolet and infrared radiation absorbing glass described above preferably contains 0.0005 to 0.005% by weight NiO.

The ultraviolet and infrared radiation absorbing glass preferably contains 0.20 to 0.90% by weight $La_2O_3$.

The ultraviolet and infrared radiation absorbing glass of the present invention preferably has such optical characteristics that the visible light transmission as measured with the CIE standard illuminant A of 70% or more and the total solar energy transmission as measured in a wavelength region of from 300 to 2,100 nm is less than 72%, when the thickness thereof is from 3.25 to 6.25 mm.

Furthermore, the ultraviolet and infrared radiation absorbing glass of the present invention preferably has such optical characteristics that the dominant wavelength thereof as measured with the CIE standard illuminant C is 572 to 580 nm and the total sunlight ultraviolet transmission defined in ISO9050 as measured in a wavelength region of from 297.5 to 377.5 nm is less than 12%, when the glass has a thickness of 3.25 to 6.25 mm.

The reasons for limitations of the composition of the ultraviolet and infrared radiation absorbing glass according to the present invention are explained below. Hereinafter, all percents used for component amounts are by weight. The composition of the glass is based on a glass composition suitable for forming by a float process.

$SiO_2$ is a main component forming a skeleton of glass. If the $SiO_2$ content is less than 65%, the glass has poor durability. If the SiO2 content exceeds 80%, the glass is difficult to melt.

Although $B_2O_3$, is a component generally used for improving glass durability or as a melting aid, it also functions to enhance ultraviolet absorption. If the $B_2O_3$ content exceeds 5%, not only the decrease of transmission in the ultraviolet region extends to the visible region, often resulting in a yellowish tint, but also troubles arise in glass forming due to vaporization of $B_2O_3$, etc. Accordingly, the upper limit of the $B_2O_3$ content should be 5%.

Al2O3 serves to improve glass durability. If the $Al_2O_3$ content exceeds 5%, the glass is difficult to melt. From the standpoint of obtaining a glass having moderately improved durability while preventing the glass from having an elevated melting temperature, the preferred range of $Al_2O_3$ content is from 0.1 to 2%.

MgO and CaO both are used for improving glass durability and for regulating a liquidus temperature and viscosity of the glass during forming. If the MgO content exceeds 10%, the liquidus temperature rises. If the CaO content is less than 5% or higher than 15%, the liquidus temperature rises. If the total content of MgO and CaO is less than 5%, the durability of the resulting glass deteriorates. If the total content thereof exceeds 15%, the liquidus temperature rises.

$Na_2O$ and $K_2O$ are used as glass melting accelerators. If the $Na_2O$ content is less than 10% or if the total content of $Na_2O$ and $K_2O$ is less than 10%, the effect of melting acceleration is poor. If the $Na_2O$ content exceeds 18% or if the total content of $Na_2O$ and $K_2O$ exceeds 20%, glass durability is decreased. $K_2O$ further has the effect of enhancing the pink coloration of Se and, at the same time, increasing the ultraviolet radiation absorbing power. It is undesirable to incorporate $K_2O$ in an amount exceeding 5%, because it is more expensive than $Na_2O$.

Iron oxide in a glass is present in the forms of $Fe_2O_3$ ($Fe^{3+}$) and FeO ($Fe^{2+}$). FeO is a component which serves to enhance infrared radiation absorbing power, while $Fe_2O_3$ is a component which serves to enhance ultraviolet radiation absorbing power together with $CeO_2$ and $TiO_2$.

If the amount of the total iron oxide (T-$Fe_2O_3$) is too small, the infrared radiation absorbing power and ultraviolet radiation absorbing power are low. If the amount thereof is too large, the visible light transmission is decreased. Therefore, the preferred range of the total iron oxide content is from 0.20 to 0.30%.

If the amount of FeO is too small, the infrared radiation absorbing power is decreased. If the amount thereof is too large, the visible light transmission is decreased. Therefore, the preferred range of FeO amount in terms of $Fe_2O_3$ is from 20.5 to 25% of the total iron oxide.

In the present invention, a relatively low total iron oxide content and a relatively high FeO content are employed mainly for the purpose of enhancing the infrared radiation absorbing power while maintaining a high visible light transmission. Those ranges of total iron oxide content and FeO content are suitable for this purpose.

$CeO_2$, which is an essential component in the present invention, serves to enhance ultraviolet radiation absorbing power. $CeO_2$ in a glass is present in the form of $Ce^{3+}$ or $Ce^{4+}$.

In particular, $Ce^{3+}$ shows reduced absorption in the visible light region and is effective in ultraviolet absorption. If the $CeO_2$ content is too high, the glass shows enhanced absorption in a shorter-wavelength part of the visible light region and is hence yellowish. In addition, since the cerium oxide used as a raw material serves as an oxidizing agent, it is difficult to maintain a high FeO/T-$Fe_2O_3$ ratio when a glass having a high $CeO_2$ content is melted. Therefore, the $CeO_2$ content is preferably from 0.65 to 1.1%.

$TiO_2$, which is an essential component in the present invention, serves to enhance ultraviolet radiation absorbing power particularly by the interaction with FeO. If the $TiO_2$ content is too high, the glass tends to be yellowish. In the present invention, a high FeO/T-$Fe_2O_3$ ratio is used with a small total iron oxide amount and, in order to facilitate reduced melting necessary for attaining the FeO/T-$Fe_2O_3$ ratio, a relatively small $CeO_2$ amount in the range of from 0.65 to 1.1% is used, as stated above. Therefore, from the standpoint of compensating for the resultant insufficiency of ultraviolet radiation absorbing power, the $TiO_2$ content is preferably from 0.35 to 1.1%.

CoO is a component for forming a bronze or neutral gray tint by the coexistence thereof with Se. If the CoO content is less than 0.001%, the desired tint cannot be obtained. If the CoO content exceeds 0.005%, the visible light transmission is decreased.

Se is a component for obtaining a bronze or neutral gray tint due to its pink coloration in combination with the complementary color of CoO. If the Se content is less then 0.0003%, the desired tint cannot be obtained. If the Se content exceeds 0.0015%, the visible light transmission is decreased.

$SO_3$ is a component which has come into the glass mainly from a sulfuric acid salt or the like used as a refining agent. In order to obtain an FeO/T-$Fe_2O_3$ ratio in the range specified above, the amount of a sulfuric acid salt, e.g., salt cake, is regulated so as to result in an $SO_3$ content in the glass of from 0.02 to 0.30%. If the $SO_3$ content is less than 0.02%, refining is insufficient. If the $SO_3$ content exceeds 0.30%, the coloration of Se is weakened disadvantageously.

NiO is a component for obtaining a neutral gray tint. If the NiO content is too high, the visible light transmission is decreased. Therefore, it should be used in an amount of 0.005% or less.

$La_2O_3$ not only is effective in decreasing the viscosity of the molten glass and accelerating glass melting, but also improves the chemical durability of the glass, such as water resistance. The addition of $La_2O_3$ to a glass containing $Fe_2O_3$ and $CeO_2$ is also effective in decreasing the ultraviolet transmission. If the $La_2O_3$ content is less than 0.20%, those effects are insufficient. Since $La_2O_3$ is an expensive raw material, the content thereof is preferably not higher than 0.90%. $La_2O_3$ may be added in the form of a raw material containing $La_2O_3$ in a high concentration. However, such a raw material is costly because it needs to be refined. From the standpoint of attaining a decreased raw-material cost, it is therefore preferred to add $La_2O_3$ in the form of a mixture of $La_2O_3$ and $CeO_2$ occurring simultaneously, without separating these, or in the form of an impurity remaining in $CeO_2$ having a low degree of purification. In the latter case, oxides of other rare earth elements, such as $Pr_2O_3$ and $Nd_2O_3$, also come as impurities into the glass in slight amounts. However, such impurities may be contained as long as this is not counter to the spirit of the invention.

The glass having the above-described composition of the present invention may further contain at least one of ZnO, MnO, $V_2O_5$, and $MoO_3$ in a total amount of 0 to 1%, as long as these ingredients are not counter to the spirit of the invention.

Of those optional ingredients, ZnO, which is apt to generate upon glass melting in a reducing atmosphere, is effective in preventing the formation of nickel sulfide causative of spontaneous fracture of a glass.

MnO, $V_2O_5$, and $MoO_3$ in the glass each serves as an ultraviolet absorbing component. These components can be used according to their degrees of ultraviolet absorption for the fine control of a bronze or neutral gray tint.

The present invention will be described in more detail by reference to the following Examples. It should however he understood that the invention is not construed as being limited thereto.

EXAMPLES

In order to obtain given glass compositions, ingredients were suitably mixed which consisted of silica sand, dolomite, limestone, soda ash, potassium carbonate, boron oxide, salt cake, ferric oxide, titanium oxide, cerium oxide, cobalt oxide, sodium selenite, nickel oxide, lanthanum oxide, and a carbonaceous material as a reducing agent. The resulting raw materials each was melted at 1,500° C. for 4 hours in an electric furnace. Each molten glass was then cast on a stainless-steel plate and annealed to obtain a glass plate having a thickness of about 7 mm. The glass plates obtained were polished so as to have thicknesses of 3.5, 4, and 5 mm. Optical characteristics of the samples thus obtained were measured. The optical characteristics included visible light transmission (YA) measured with the CIE standard illuminant A, total solar energy transmission (TG), ultraviolet radiation transmission (Tuv) defined in ISO 9050, dominant wavelength (Dw) and excitation purity (Pe) both measured with the CIE standard illuminant C, and L*, a*, and b* defined in CIE.

The results obtained in the Examples are shown in Tables 1 to 5, which show the concentration of each component in each sample obtained and the values of optical characteristics for each sample. All values of concentration given in the Tables are % by weight, and the values of the ratio of FeO in terms of $Fe_2O_3$ to $T-Fe_2O_3$ are also given in %.

TABLE 1

|  | Example 1 | Example 2 | Example 3 |
|---|---|---|---|
| Composition (wt %) | | | |
| $SiO_2$ | 70.6 | 70.7 | 70.9 |
| $B_2O_3$ | — | — | — |
| $Al_2O_3$ | 1.4 | 1.4 | 1.4 |
| MgO | 4.0 | 4.0 | 4.0 |
| CaO | 8.0 | 8.0 | 8.0 |
| $Na_2O$ | 13.0 | 13.0 | 13.0 |
| $K_2O$ | 0.7 | 0.7 | 0.7 |
| Se | 0.0011 | 0.0009 | 0.0011 |
| CoO | 0.0020 | 0.0025 | 0.0025 |
| $CeO_2$ | 1.00 | 1.10 | 0.85 |
| $TiO_2$ | 1.00 | 0.90 | 0.90 |
| NiO | — | — | — |
| $La_2O_3$ | — | — | — |
| $T-Fe_2O_3$ | 0.27 | 0.23 | 0.25 |
| FeO | 0.057 | 0.050 | 0.050 |
| $FeO/T-Fe_2O_3$ (%) | 23.3 | 24.1 | 22.4 |
| $SO_3$ | 0.05 | 0.07 | 0.08 |
| Optical Characteristics | | | |
| Thickness (mm) | 3.5 | 3.5 | 3.5 |
| YA (%) | 73.5 | 74.0 | 74.0 |
| TG (%) | 67.8 | 69.8 | 69.8 |
| L⁺ | 88.4 | 88.6 | 88.7 |
| a⁺ | −0.88 | −0.74 | −0.83 |
| b⁺ | 7.02 | 6.50 | 4.50 |

TABLE 1-continued

|  | Example 1 | Example 2 | Example 3 |
|---|---|---|---|
| λd | 574 | 576 | 573 |
| Pe (%) | 7.10 | 6.30 | 4.49 |
| Tuv (%) | 9.2 | 10.3 | 11.9 |

TABLE 2

|  | Example 4 | Example 5 | Example 6 |
|---|---|---|---|
| Composition (wt %) | | | |
| $SiO_2$ | 70.9 | 70.8 | 70.8 |
| $B_2O_3$ | — | — | — |
| $Al_2O_3$ | 1.4 | 1.6 | 1.6 |
| MgO | 4.0 | 4.0 | 4.0 |
| CaO | 8.0 | 8.0 | 8.0 |
| $Na_2O$ | 13.0 | 13.0 | 13.0 |
| $K_2O$ | 0.7 | 0.8 | 0.8 |
| Se | 0.0011 | 0.0011 | 0.0011 |
| CoO | 0.0025 | 0.0020 | 0.0020 |
| $CeO_2$ | 0.85 | 0.85 | 0.85 |
| $TiO_2$ | 0.90 | 0.70 | 0.70 |
| NiO | — | — | — |
| $La_2O_3$ | — | — | — |
| $T-Fe_2O_3$ | 0.25 | 0.25 | 0.25 |
| FeO | 0.047 | 0.056 | 0.046 |
| $FeO/T-Fe_2O_3$ (%) | 20.7 | 24.8 | 20.5 |
| $SO_3$ | 0.09 | 0.05 | 0.09 |
| Optical Characteristics | | | |
| Thickness (mm) | 3.5 | 4.0 | 4.0 |
| YA (%) | 74.2 | 72.7 | 74.0 |
| TG (%) | 70.7 | 66.8 | 69.3 |
| L⁺ | 88.5 | 88.0 | 88.1 |
| a⁺ | −0.70 | −0.73 | −0.36 |
| b⁺ | 4.92 | 5.96 | 5.78 |
| λd | 576 | 575 | 576 |
| Pe (%) | 5.05 | 6.18 | 5.91 |
| Tuv (%) | 11.4 | 11.4 | 11.4 |

TABLE 3

|  | Example 7 | Example 8 | Example 9 | Example 10 |
|---|---|---|---|---|
| Composition (wt %) | | | | |
| $SiO_2$ | 71.0 | 70.6 | 71.4 | 70.0 |
| $B_2O_3$ | — | — | — | 2.0 |
| $Al_2O_3$ | 1.6 | 1.6 | 1.6 | 1.4 |
| MgO | 4.0 | 4.0 | 4.0 | 3.9 |
| CaO | 8.0 | 8.0 | 8.0 | 8.0 |
| $Na_2O$ | 13.0 | 13.0 | 13.0 | 12.8 |
| $K_2O$ | 0.8 | 0.8 | 0.8 | 0.7 |
| Se | 0.0011 | 0.0009 | 0.0007 | 0.0007 |
| CoO | 0.0015 | 0.0027 | 0.0012 | 0.0012 |
| $CeO_2$ | 0.85 | 0.70 | 0.65 | 0.65 |
| $TiO_2$ | 0.50 | 1.10 | 0.35 | 0.35 |
| NiO | — | — | — | — |
| $La_2O_3$ | — | — | — | — |
| $T-Fe_2O_3$ | 0.25 | 0.25 | 0.25 | 0.25 |
| FeO | 0.047 | 0.048 | 0.055 | 0.054 |
| $FeO/T-Fe_2O_3$ (%) | 20.7 | 21.3 | 24.4 | 24.0 |
| $SO_3$ | 0.09 | 0.09 | 0.07 | 0.07 |
| Optical Characteristics | | | | |
| Thickness (mm) | 5.0 | 4.0 | 5.0 | 4.0 |
| YA (%) | 72.0 | 71.9 | 72.2 | 73.4 |
| TG (%) | 65.8 | 67.6 | 65.1 | 67.1 |
| L⁺ | 87.6 | 87.4 | 87.7 | 88.2 |
| a⁺ | −0.45 | −0.51 | −0.24 | −0.31 |
| b⁺ | 6.61 | 6.33 | 4.67 | 5.26 |

TABLE 3-continued

|  | Example 7 | Example 8 | Example 9 | Example 10 |
|---|---|---|---|---|
| λd | 576 | 576 | 576 | 576 |
| Pe (%) | 6.93 | 6.62 | 5.52 | 5.35 |
| Tuv (%) | 10.2 | 10.3 | 11.9 | 10.3 |

TABLE 4

|  | Example 11 | Example 12 | Example 13 | Example 14 |
|---|---|---|---|---|
| Composition (wt %) | | | | |
| $SiO_2$ | 71.0 | 71.1 | 70.6 | 70.7 |
| $B_2O_3$ | — | — | — | — |
| $Al_2O_3$ | 1.4 | 1.4 | 1.8 | 2.0 |
| MgO | 4.0 | 4.0 | 4.0 | 4.0 |
| CaO | 8.0 | 8.0 | 8.0 | 8.0 |
| $Na_2O$ | 13.0 | 13.0 | 13.0 | 13.0 |
| $K_2O$ | 0.7 | 0.7 | 1.0 | 1.1 |
| Se | 0.0008 | 0.0006 | 0.0011 | 0.0008 |
| CoO | 0.0035 | 0.0018 | 0.0015 | 0.0011 |
| $CeO_2$ | 0.65 | 0.65 | 0.85 | 0.65 |
| $TiO_2$ | 1.10 | 0.90 | 0.50 | 0.35 |
| NiO | — | — | 0.0010 | 0.0020 |
| $La_2O_3$ | — | — | — | — |
| $T-Fe_2O_3$ | 0.20 | 0.30 | 0.25 | 0.25 |
| FeO | 0.045 | 0.056 | 0.049 | 0.049 |
| $FeO/T-Fe_2O_3$ (%) | 25.0 | 20.7 | 21.8 | 21.8 |
| $SO_3$ | 0.06 | 0.10 | 0.08 | 0.08 |
| Optical Characteristics | | | | |
| Thickness (mm) | 5.0 | 3.5 | 5.0 | 5.0 |
| YA (%) | 72.2 | 73.3 | 71.5 | 71.5 |
| TG (%) | 66.1 | 68.0 | 65.1 | 64.9 |
| $L^+$ | 87.9 | 88.5 | 87.8 | 87.7 |
| $a^+$ | −0.43 | −0.42 | −0.39 | −0.17 |
| $b^+$ | 5.15 | 6.52 | 6.97 | 5.21 |
| λd | 576 | 576 | 576 | 576 |
| Pe (%) | 6.11 | 6.70 | 6.91 | 5.40 |
| Tuv (%) | 9.9 | 11.8 | 9.8 | 11.9 |

TABLE 5

|  | Example 15 | Example 16 | Example 17 |
|---|---|---|---|
| Composition (wt %) | | | |
| $SiO_2$ | 70.0 | 70.6 | 71.1 |
| $B_2O_3$ | — | — | — |
| $Al_2O_3$ | 1.4 | 1.4 | 1.6 |
| MgO | 4.0 | 4.0 | 4.0 |
| CaO | 8.0 | 8.0 | 8.0 |
| $Na_2O$ | 13.0 | 13.0 | 13.0 |
| $K_2O$ | 0.7 | 0.7 | 0.8 |
| Se | 0.0009 | 0.0011 | 0.0009 |
| CoO | 0.0025 | 0.0020 | 0.0012 |
| $CeO_2$ | 1.10 | 0.85 | 0.65 |
| $TiO_2$ | 0.90 | 0.70 | 0.35 |
| NiO | — | — | — |
| $La_2O_3$ | 0.70 | 0.51 | 0.30 |
| $T-Fe_2O_3$ | 0.25 | 0.25 | 0.24 |
| FeO | 0.051 | 0.053 | 0.052 |
| $FeO/T-Fe_2O_3$ (%) | 22.6 | 23.5 | 24.1 |
| $SO_3$ | 0.08 | 0.07 | 0.06 |
| Optical Characteristics | | | |
| Thickness (mm) | 3.5 | 4.0 | 5.0 |
| YA (%) | 74.0 | 72.7 | 74.1 |
| TG (%) | 69.8 | 66.8 | 65.0 |
| $L^+$ | 88.6 | 88.0 | 88.7 |
| $a^+$ | −0.74 | −0.73 | −0.23 |
| $b^+$ | 6.50 | 5.96 | 4.82 |
| λd | 576 | 575 | 576 |

TABLE 5-continued

|  | Example 15 | Example 16 | Example 17 |
|---|---|---|---|
| Pe (%) | 6.30 | 6.18 | 5.03 |
| Tuv (%) | 10.3 | 11.4 | 11.9 |

The samples obtained in Examples 1 to 12, shown in Tables 1 to 4, each was within the scope of claim 1. Specifically, each sample had a composition which contained 0.20 to 0.30% total iron oxide in terms of $Fe_2O_3$, 0.65 to 1.1% $CeO_2$, 0.35 to 1.1% $TiO_2$, 0.001 to 0.005% CoO, 0.0003 to 0.0015% Se, and 0.02 to 0.30% $SO_3$ and in which the proportion of FeO in terms of $Fe_2O_3$ to $T-Fe_2O_3$ was from 20.5 to 25%.

Of the samples obtained in the above Examples, the sample of Example 10 was a glass containing 2% $B_2O_3$ so as to have a reduced ultraviolet transmission and improved glass durability.

The samples obtained in Examples 13 and 14, which were within the scope of the preferred embodiment, contained NiO so as to have a controlled tint.

The samples obtained in Examples 15 to 17, which were within the scope of the further preferred embodiment, contained $La_2O_3$ so as to have a reduced ultraviolet transmission and improved chemical durability.

The samples obtained in the Examples each was a bronze or neutral gray-tinted ultraviolet and infrared radiation absorbing glass having a visible light transmission as measured with the CIE standard illuminant A of 70% or more, a total solar energy transmission of less than 72%, a dominant wavelength and an excitation purity as measured with the CIE standard illuminant C of 572 to 580 nm and less than 8%, respectively, and an ultraviolet transmission defined in ISO 9050 of less than 12%.

COMPARATIVE EXAMPLES

Comparative Examples to the present invention are shown in Table 6.

TABLE 6

|  | Comparative Example 1 | Comparative Example 2 | Comparative Example 3 |
|---|---|---|---|
| Composition (wt %) | | | |
| $SiO_2$ | 71.8 | 70.9 | 70.8 |
| $B_2O_3$ | — | — | — |
| $Al_2O_3$ | 1.7 | 1.4 | 1.6 |
| MgO | 3.6 | 4.0 | 4.0 |
| CaO | 7.0 | 8.0 | 8.0 |
| $Na_2O$ | 13.0 | 13.0 | 13.0 |
| $K_2O$ | 0.8 | 0.7 | 0.8 |
| Se | 0.0010 | 0.0008 | 0.0011 |
| CoO | 0.0025 | 0.0005 | 0.0020 |
| $CeO_2$ | 0.90 | 0.41 | 0.00 |
| $TiO_2$ | 1.06 | 0.31 | 2.00 |
| NiO | — | — | — |
| $La_2O_3$ | — | — | — |
| $T-Fe_2O_3$ | 0.18 | 0.40 | 0.27 |
| FeO | 0.025 | 0.079 | 0.062 |
| $FeO/T-Fe_2O_3$ (%) | 15.6 | 21.8 | 25.6 |
| $SO_3$ | 0.09 | 0.08 | 0.06 |

TABLE 6-continued

|  | Comparative Example 1 | Comparative Example 2 | Comparative Example 3 |
|---|---|---|---|
| Optical Characteristics | | | |
| Thickness (mm) | 5.0 | 4.0 | 3.5 |
| YA (%) | 73.5 | 73.4 | 71.5 |
| TG (%) | 73.0 | 59.5 | 66.1 |
| L+ | 88.2 | 87.8 | 87.2 |
| a+ | 0.23 | −0.56 | −0.22 |
| b+ | 4.81 | 8.56 | 8.10 |
| λd | 578 | 574 | 577 |
| Pe (%) | 5.11 | 8.40 | 8.55 |
| Tuv (%) | 9.0 | 16.7 | 21.4 |

The sample obtained in Comparative Example 1 was outside the scope of the present invention with respect to T-$Fe_2O_3$ content and FeO/T-$Fe_2O_3$ ratio. This sample had a total solar energy transmission of 72% or more. The sample obtained in Comparative Example 2 was outside the scope of the present invention with respect to T-$Fe_2O_3$, $CeO_2$, $TiO_2$, and CoO contents, while the sample obtained in Comparative Example 3 was outside the scope of the present invention with respect to $CeO_2$ and $TiO_2$ contents and FeO/T-$Fe_2O_3$ ratio. The samples of Comparative Examples 2 and 3 each had an excitation purity of 8% or more and an ultraviolet transmission defined in ISO 9050 of 12% or more. Thus, the glasses of Comparative Examples 1 to 3 each failed to combine a bronze or neutral gray tint, a low total solar energy transmission, and a low ultraviolet transmission.

As apparent from the Examples and Comparative Examples given above, the glass of the present invention is an excellent ultraviolet and infrared radiation absorbing glass which combines a bronze or neutral gray tint, a low ultraviolet transmission, and a low total solar energy transmission.

According to the present invention, an ultraviolet and infrared radiation absorbing glass having enhanced infrared radiation absorbing power while retaining a high visible light transmission can be obtained by regulating the total iron oxide content to a value as small as from 0.20 to 0.30% and regulating the proportion of FeO in terms of $Fe_2O_3$ to a relatively large value of from 20.5 to 25% based on the total iron oxide. Furthermore, the glass has been regulated so as to have a $CeO_2$ content of from 0.65 to 1.1% for facilitating reduced melting and have a $TiO_2$ content of from 0.35 to 1.1% for compensating for insufficiency of ultraviolet radiation absorbing power. Thus, the glass according to the present invention is an excellent ultraviolet and infrared radiation absorbing glass which combines a bronze or neutral gray tint, obtained by the coloration of Se in combination with that of CoO, a low ultraviolet transmission, and a low total solar energy transmission.

According to the preferred embodiment, a glass tinted with a regulated bronze or neutral gray tone while retaining the various optical characteristics attained due to the above constitution can be obtained by incorporating NiO.

According to the further preferred embodiment, a glass having improved chemical durability and a reduced ultraviolet transmission while retaining the various optical characteristics attained due to the above constitution can be obtained by incorporating $La_2O_3$.

POSSIBLE COMMERCIAL USE OF THE INVENTION

As described above in detail, the ultraviolet and infrared radiation absorbing glass of the present invention makes it possible to produce a glass tinted with a bronze or neutral gray tone and having excellent ultraviolet radiation absorbing power.

Furthermore, since the ultraviolet and infrared radiation absorbing glass of the present invention has high ultraviolet radiation absorbing power and a bronze or neutral gray tint, it is suitable for use as, e.g., a window glass for automobiles and other vehicles and for buildings. In such applications, the glass of the present invention is highly effective in, e.g., preventing the interior materials from deteriorating or fading.

What is claimed is:

1. An ultraviolet and infrared radiation absorbing glass comprising, in % by weight:

basic glass components comprising
65 to 80% $SiO_2$,
0 to 5% $B_2O_3$,
0 to 5% $Al_2O_3$,
0 to 10% MgO,
5 to 15% CaO,
10 to 18% $Na_2O$, and
0 to 5% $K_2O$, provided that the sum of MgO and CaO is 5 to 15% and the sum of $Na_2O$ and $K_2O$ is 10 to 20%;

coloring components comprising
0.20 to 0.30% total iron oxide (T-$Fe_2O_3$) in terms of $Fe_2O_3$,
0.65 to 1.1% $CeO_2$,
0.35 to 1.1% $TiO_2$,
0.001 to 0.005% CoO, and
0.0003 to 0.0015% Se; and an additional component comprising
0.02 to 0.30% $SO_3$, wherein 20.5 to 25% of said T-$Fe_2O_3$ is FeO in terms of $Fe_2O_3$, and said ultraviolet and infrared radiation absorbing glass has a dominant wavelength and an excitation purity, as measured with the CIE standard illuminant C, of 572 to 580 nm and 4.49%–7.10%, respectively, when the glass has a thickness of 3.25 to 6.25 mm.

2. The ultraviolet and infrared radiation absorbing glass of claim 1, which further comprises 0.0005 to 0.005% by weight NiO.

3. The ultraviolet and infrared radiation absorbing glass of claim 1 or 2, which further comprises 0.20 to 0.90% by weight $La_2O_3$.

4. The ultraviolet and infrared radiation absorbing glass of any one of claims 1 to 2, which has a visible light transmission of 70% or more as measured with the CIE standard illuminant A, when the glass has a thickness if 3.25 to 6.25 mm.

5. The ultraviolet and infrared radiation absorbing glass of any one of claims 1 to 2, which has a solar energy transmission of less than 72%, when the glass has a thickness of 3.25 to 6.25 mm.

6. The ultraviolet and infrared radiation absorbing glass of any of claims 1 to 2, which has an ultraviolet transmission defined in ISO 9050 of less than 12%, when the glass has a thickness of 3.25 to 6.25 mm.

* * * * *